(12) United States Patent
Yogev et al.

(10) Patent No.: US 12,131,055 B2
(45) Date of Patent: *Oct. 29, 2024

(54) CONTINUOUS MONOTONIC COUNTER FOR MEMORY DEVICES

(71) Applicant: Infineon Technologies LLC, San Jose, CA (US)

(72) Inventors: Yoav Yogev, Mazkeret-Batya (IL); Amichai Givant, Rosh-Ha'ain (IL); Amir Rochman, Tel-Aviv (IL); Shivananda Shetty, Fremont, CA (US); Pawan Singh, Cupertino, CA (US); Yair Sofer, Tel-Aviv (IL)

(73) Assignee: Infineon Technologies LLC, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/102,825

(22) Filed: Jan. 30, 2023

(65) Prior Publication Data

US 2023/0244409 A1 Aug. 3, 2023

Related U.S. Application Data

(63) Continuation of application No. 16/906,892, filed on Jun. 19, 2020, now Pat. No. 11,567,691.

(60) Provisional application No. 62/964,384, filed on Jan. 22, 2020.

(51) Int. Cl.
  *G06F 3/06* (2006.01)
(52) U.S. Cl.
  CPC .......... *G06F 3/0653* (2013.01); *G06F 3/0604* (2013.01); *G06F 3/0652* (2013.01); *G06F 3/0659* (2013.01); *G06F 3/0679* (2013.01)

(58) Field of Classification Search
  CPC .... G06F 3/0653; G06F 3/0604; G06F 3/0679; G06F 3/0659; G06F 3/0652; G06F 11/00; G06F 11/1441; G06F 2212/202; H03K 21/403; H03K 21/40; H03K 21/00; H03K 25/00
  See application file for complete search history.

(56) References Cited

U.S. PATENT DOCUMENTS

| | | | |
|---|---|---|---|
| 6,687,325 B1 * | 2/2004 | Wells | H03K 21/403 377/28 |
| 11,567,691 B2 * | 1/2023 | Yogev | G06F 3/064 |
| 2014/0219018 A1 * | 8/2014 | Kalderon | G11C 16/225 365/185.03 |
| 2020/0202944 A1 * | 6/2020 | Mondello | G11C 16/105 |

FOREIGN PATENT DOCUMENTS

JP 2009251700 A * 10/2009

* cited by examiner

*Primary Examiner* — Curtis James Kortman

(57) ABSTRACT

Systems, methods, and devices implement counters with fault tolerance and power loss protection. Systems include a non-volatile memory device that includes a first counter configured to store a first plurality of data values representing a plurality of count operations, and a second counter configured to store a second plurality of data values representing an initiation and a completion of each erase operation performed on the first counter. Systems also include control circuitry configured to generate a count value based on a current counter value of the first counter, a current counter value of the second counter, and at least one physical parameter of the first counter.

20 Claims, 14 Drawing Sheets

CONTINUOUS MONOTONIC COUNTER FOR MEMORY DEVICES

CROSS-REFERENCE TO RELATED APPLICATIONS

This application is a Continuation of U.S. Non-Provisional application Ser. No. 16/906,892, filed on Jun. 19, 2020, now U.S. Pat. No. 11,567,691 issued on Jan. 31, 2023, which claims the benefit under 35 U.S.C. § 119 (e) of U.S. Provisional Patent Application No. 62/964,384, filed on Jan. 22, 2020, which are incorporated herein by reference in its entirety for all purposes.

TECHNICAL FIELD

This disclosure generally relates to memory devices, and more specifically, to the implementation of counters associated with memory devices.

BACKGROUND

Memory devices may include various memory cells that are configured to store data values based on programming received via various word lines and bit lines. Memory cells, and storage locations mapped to such memory cells, may be referenced using memory addresses, which may be numerical strings used to identify such storage locations. Memory devices may be used to store numbers, such as count values generated by counters for various processing operations. As higher capacity counters are implemented, the size of memory used to store count values increases. Thus, the amount of memory required to store the count values and associated data may be large, and may utilize a relatively large amount of system resources. Accordingly, traditional memory devices remain limited in their ability to efficiently track memory count values in a manner that reduces the use of such system resources, and is also immune to power loss events.

DETAILED DESCRIPTION

In the following description, numerous specific details are set forth in order to provide a thorough understanding of the presented concepts. The presented concepts may be practiced without some or all of these specific details. In other instances, well known process operations have not been described in detail so as not to unnecessarily obscure the described concepts. While some concepts will be described in conjunction with the specific examples, it will be understood that these examples are not intended to be limiting.

Counters may be implemented in devices, such as memory devices, and may be configured to implement various count operations to generate count numbers utilized by the memory devices. Some counters may be limited in their ability to implement counters because the amount of memory required to store count values may occupy a large amount of memory and system resources. Moreover, such counters might not be secure, and might be vulnerable to malicious actions intended to alter count numbers, as well as power loss events that might occur during operation of the memory devices and count operations associated with the memory devices.

Embodiments disclosed herein provide monotonic counters with robust read and write capabilities and fault tolerance for power loss events. As will be discussed in greater detail below, a combination of counters it utilized to implement a counting scheme which may be used to dynamically compute full count values, and thus reduce an overall amount of memory utilized for count operations. Moreover, the counters may be implemented in a secure manner that is configured to identify and prevent malicious actions and/or data corruption from power loss events. In this way, counters disclosed herein may be included in secure memory devices, such as secure flash devices which may be non-volatile memory devices. For example, such secure flash devices may be charge trap NOR flash devices.

Figure 1:
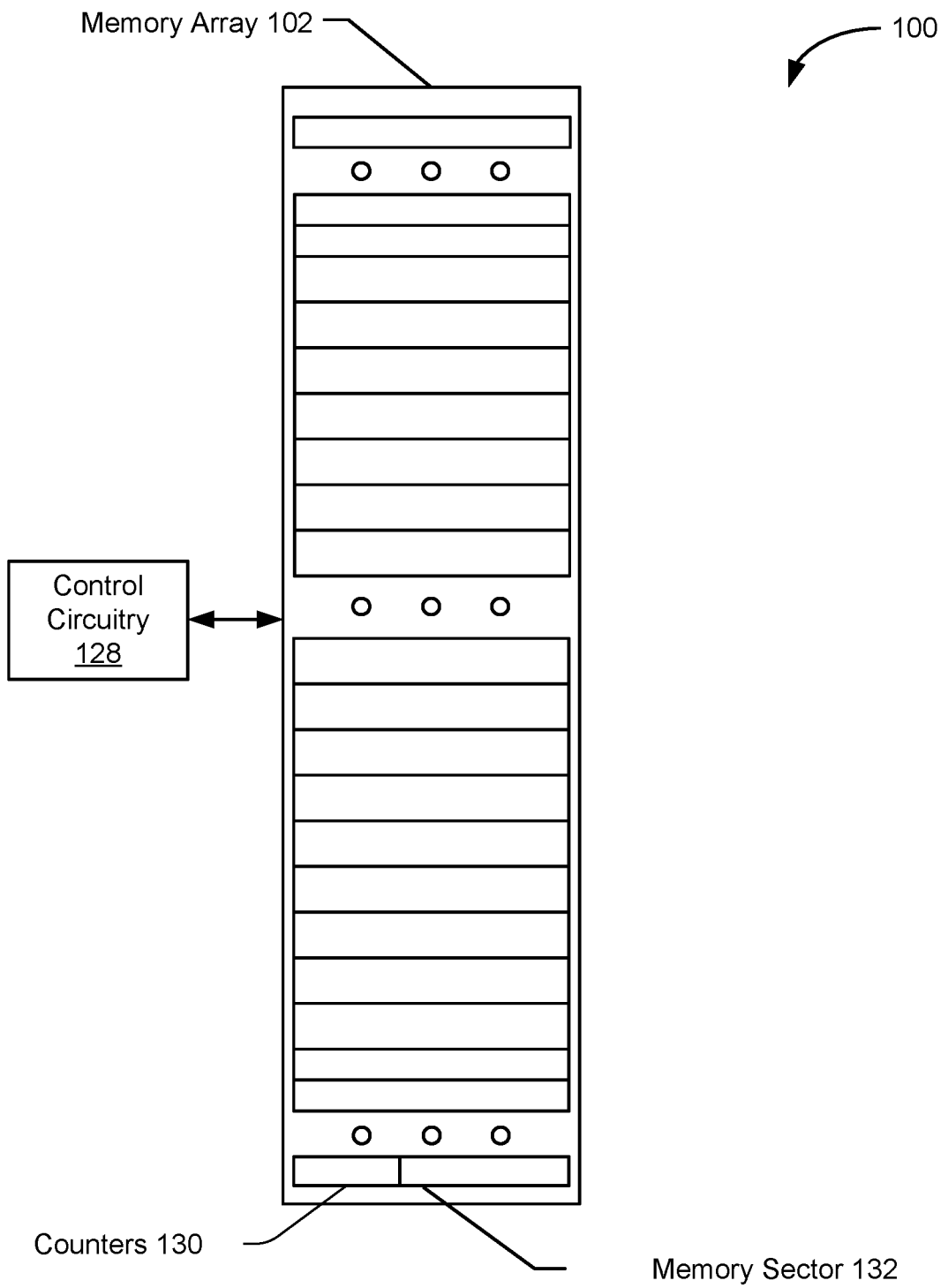
FIG. 1 illustrates an example of a memory device, configured in accordance with some embodiments.

FIG. 1 illustrates an example of a memory device, configured in accordance with some embodiments. As discussed above, memory devices, such as memory device 100, may include bit counters that are used to implement counting operations. More specifically, such bit counters may be implemented monotonically such that they only count in one direction. As will be discussed in greater detail below, counters implemented within memory device 100 are configured to achieve high count numbers with relatively low area cost, and also in a manner that is immune to power loss events.

In various embodiments, memory device 100 may be a storage device that includes several non-volatile memory elements in a memory array, such as memory array 102. Accordingly, memory array 102 may include numerous columns and rows of memory elements that may be grouped or divided into sectors. In various embodiments, such sectors may be a group of data units, such as words, that may be erased as a unit. In various embodiments, the sectors shown in FIG. 1 are logical sectors that may be mapped to physical sectors. In some embodiments, logical sectors may be sectors of data that are referenced by a memory array address that is independent of the physical location of the data within the memory array. Accordingly, a host system may view a logical sector as residing at particular address (e.g. starting at address zero of the memory array). In this example, the data may actually be located in a different part of the memory array address space, at a different physical address. In various embodiments, memory device 100 maintains a mapping table from the logical address of the data to corresponding actual physical locations. In this way, memory device 100 may include various physical memory sectors that may be mapped to logical memory sectors.

In various embodiments, memory array 102 may include memory sector 132 which is configured to include and implement counters 130. In various embodiments, memory sector 132 includes numerous small memory sectors. As similarly discussed above, counters 130 are configured to implement count operations that may be used during various operations implemented by memory device 100. In some embodiments, counters 130 are monotonic counters that count in a single direction. Such implementation of monotonic counters provides enhanced security for memory device 100. As will be discussed in greater detail below, counters 130 are configured to have an architecture that enables the implementation of a relatively high count number using relatively little system resources and memory space. For example, counters 130 may be configured to implement a $2^{32}$ count using three small memory sectors. While a size of a small memory sector may vary based on an implemented fabrication technology. For example, a small memory sector may include 128 word lines if implemented using a 45 nm fabrication technique. As will be discussed in greater detail below, counters 130 are configured to include multiple counters configured to maintain local and global counts. Moreover, the counting scheme supported by the configuration of counters 130 enables the counting and generation of memory addresses in a manner that does not require the storage and maintenance of entire addresses.

Moreover, the configuration of counters 130 is further configured to provide immunity from power loss events. As will be discussed in greater detail below, a power loss event may be when a system component, such as memory array 102, loses power. In various embodiments, the configuration of counters 130 includes multiple counters used in combination as local and global counters to implement and maintain a counting scheme utilized by memory device 100. Such a combination of local and global counters enables the implementation of such a counting scheme with reduced system resources, such as an amount of memory used to store such address information. While counters 130 are shown as being included in memory array 102, counters 130 may be implemented in any suitable location. For example, counters 130 may be implemented in a separate storage location, such as a different memory array or a dedicated storage device. Furthermore, while FIG. 1 illustrates one example of a configuration of counters 130, it will be appreciated that additional configurations may be implemented as well that may include additional counters, such as a total of six counters. In this way, the implementation of counters 130 may be scalable based on the memory availability of memory device 100, as well as the counting needs of memory device 100.

Memory device 100 further includes control circuitry 128 which is coupled to memory array 102. In various embodiments, control circuitry 128 includes one or more processors configured to implement read and write operations associated with counters 130, as well as determinations associated with counters 130. Accordingly, control circuitry 128 may be configured to generate control signals associated with such read and write operations, as well as underlying program and erase operations. Additional details regarding such operations are discussed in greater detail below.

Figure 2A:
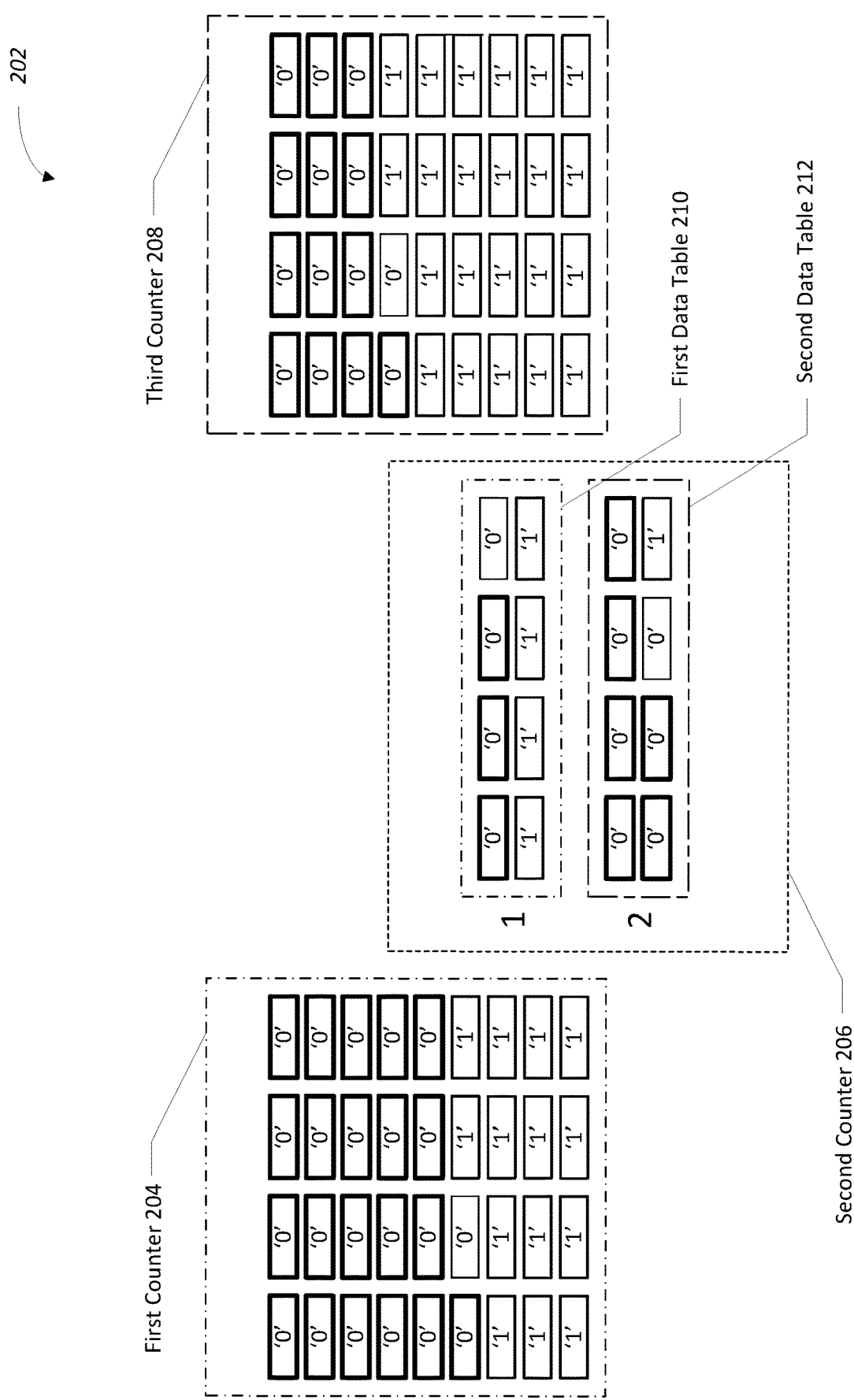
FIG. 2A illustrates an example of monotonic counters, configured in accordance with some embodiments.

FIG. 2A illustrates an example of monotonic counters, configured in accordance with some embodiments. As discussed above, memory devices may include bit counters, such as counters 202, that are used to implement counting operations and maintain a count number. As will be discussed in greater detail below, multiple counters may be implemented in combination to achieve high count numbers with relatively low area cost, and also in a manner that is immune to power loss events.

As shown in FIG. 2A, counters 202 include first counter 204, second counter 206, and third counter 208. In various embodiments, each of first counter 204, second counter 206, and third counter 208 may include various storage locations also referred to herein as addresses. For example, the counters may each include an array of memory cells configured to store data values used to track counting operations. In one example, each of first counter 204 and second counter 206 may be cycled up to $2^{15}$ and thus track about 32K counts each. As shown in FIG. 2A, each of the memory cells may be programmed to an initial value, and each counting operation may cause the change of a value in a memory cell to switch to a different programmed value. More specifically, an initial value may be a "high" value such as a value of "1", and a programmed value may be a "low" value such as a value of "0". In this way, values stored in the counters may be used to track counting operations.

In one example, first counter 204 and third counter 208 are implemented as local counters. As used herein, a local counter may refer to a counter that is configured to be incremented responsive to a counting operation that is part of an addressing operation. Accordingly, each time a count is implemented, a local counter may be incremented to track the count. Moreover, second counter 206 is implemented as a global counter. As used herein, a global counter may refer to a counter that is configured to be incremented responsive to a local counter being filled and reset. As will be discussed in greater detail below, when a local counter reaches its maximum count number, it may be reset and the global counter may be incremented.

As shown in FIG. 2A, a global counter, such as second counter 206, may be configured to maintain count data for multiple local counters, such as first counter 204 and third counter 208. For example, second counter 206 may include first data table 210 allocated to first counter 204, and may also include second data table 212 allocated to third counter 208. In this way, a single global counter may be used to implement and maintain multiple separate counters, and a number of counters may be dynamically scaled based on the needs of a memory device.

Moreover, and as will be discussed in greater detail below, the values stored in the counters may be data values such as a "high" value or a "low" value, or any other suitable flag, such as one of or combinations of data values such as "1" or "0". In this way, the data values stored in memory are not actual count values of count numbers, but are flags that are used to compute such count values dynamically. In this way, the stored representation of count values is reduced, and memory utilized to store and maintain count information is reduced.

Figure 2B:
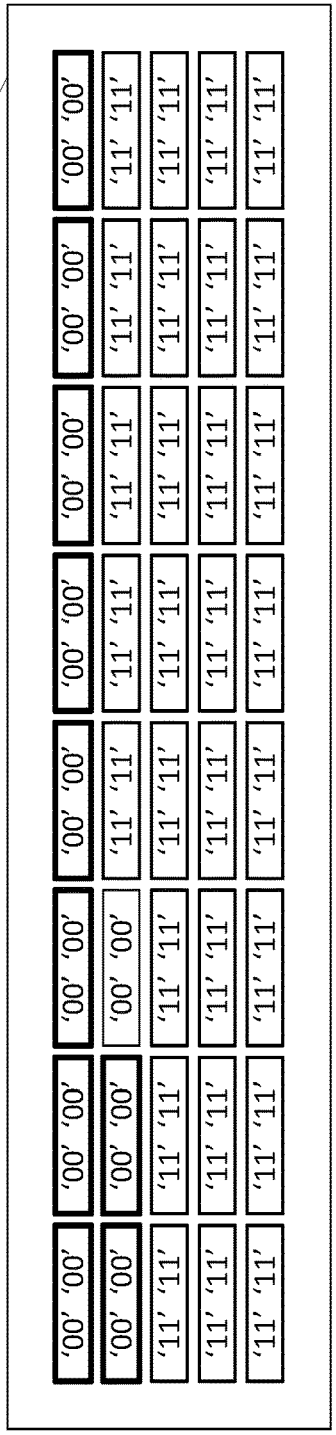
FIG. 2B illustrates another example of an example of monotonic counters, configured in accordance with some embodiments.
Figure 2B:
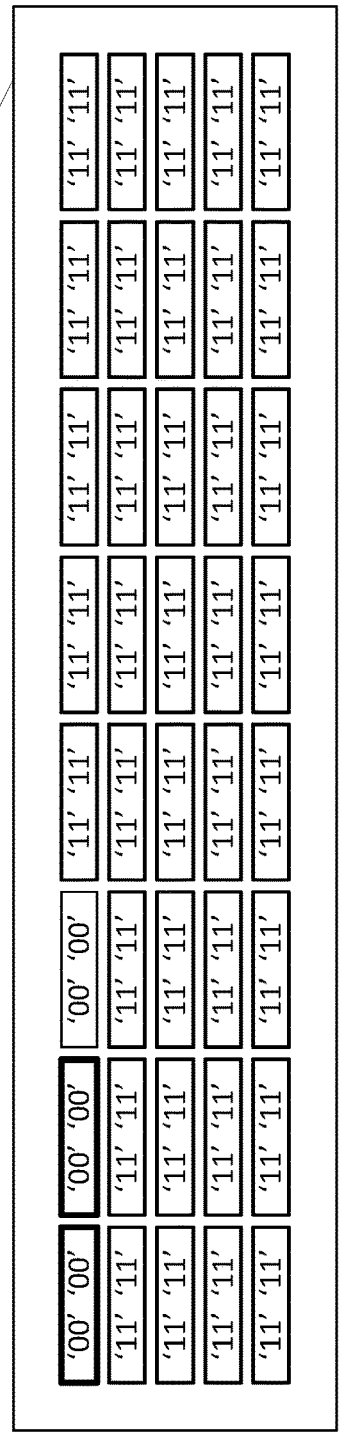

FIG. 2B illustrates another example of an example of monotonic counters, configured in accordance with some embodiments. As discussed above, memory devices may include bit counters, such as counters 220, that are used to implement counting operations and maintain a count number. As will be discussed in greater detail below, combinations of counters may be implemented to achieve high count numbers with relatively low area cost. Moreover, as will also be discussed in greater detail below, the representation of counts within the counters may be configured to provide immunity to power loss events that may occur in systems that include memory devices disclosed herein.

As shown in FIG. 2B, counters 220 include local counter 222 and global counter 224. As also shown in FIG. 2B, storage locations of the counters may be configured to store multiple data values. In one example, a particular storage location may be configured to store pairs of values such as "11" and "00". In various embodiments the usage of multiple data values provides redundancy in the storing of data values that may be used to verify data integrity and provide fault tolerance against power loss events if one occurs during counting operations.

In the specific example shown in FIG. 2B, global counter 224 has been incremented to a storage location that is third from its beginning location, and local counter 222 has been incremented to a location that is eleventh from its beginning location. In various embodiments, a system component, such as control circuitry, is configured to know an overall size of each local counter 222 and global counter 224, as may have been determined during an initial configuration operation used to implement local counter 222 and global counter 224.

For example, a size of local counter 222 and global counter 224 as well as a number of word lines included in each may be known to the memory device, and may be used to compute a count value represented by local counter 222 and global counter 224. More specifically, local counter 222 may have 128 word lines, and may be capable of 1048 counts per word line. Accordingly, local counter 222 may be capable of a maximum of 134,144 counts. As indicated by global counter 224, local counter 222 has already been cycled three times. Accordingly, the global count number may be used to determine a first number of 402432, which may be a partial count value, and this number may be combined with a current position of local counter 222, which in this case is 11, to generate an overall count number of 402,443. In this way, the data values stored in global and local counters may be used in combination with predetermined counter parameters, such a counter size and word line number, to dynamically compute count numbers.

Furthermore, additional bits used in flags may be used to enhance data integrity. As mentioned above, the storage locations may be configured to store pairs of values such as "11" and "00". In various embodiments, a system component, such as control circuitry, may be configured to implement one or more operations, such as a majority decision operation, on the stored bits. For example, a bit represented by three out of the four bits may be identified as the stored value. If the values stored are "11" and "10", the stored value may be identified as "1". Accordingly, in situations where a bit having a low reliability flips from a 0 to 1, the majority decision operations may be implemented to reduce the risk that this flip will affect counter value. Additional operations related to data integrity maintenance and power loss immunity are discussed in greater detail below.

Figure 3:
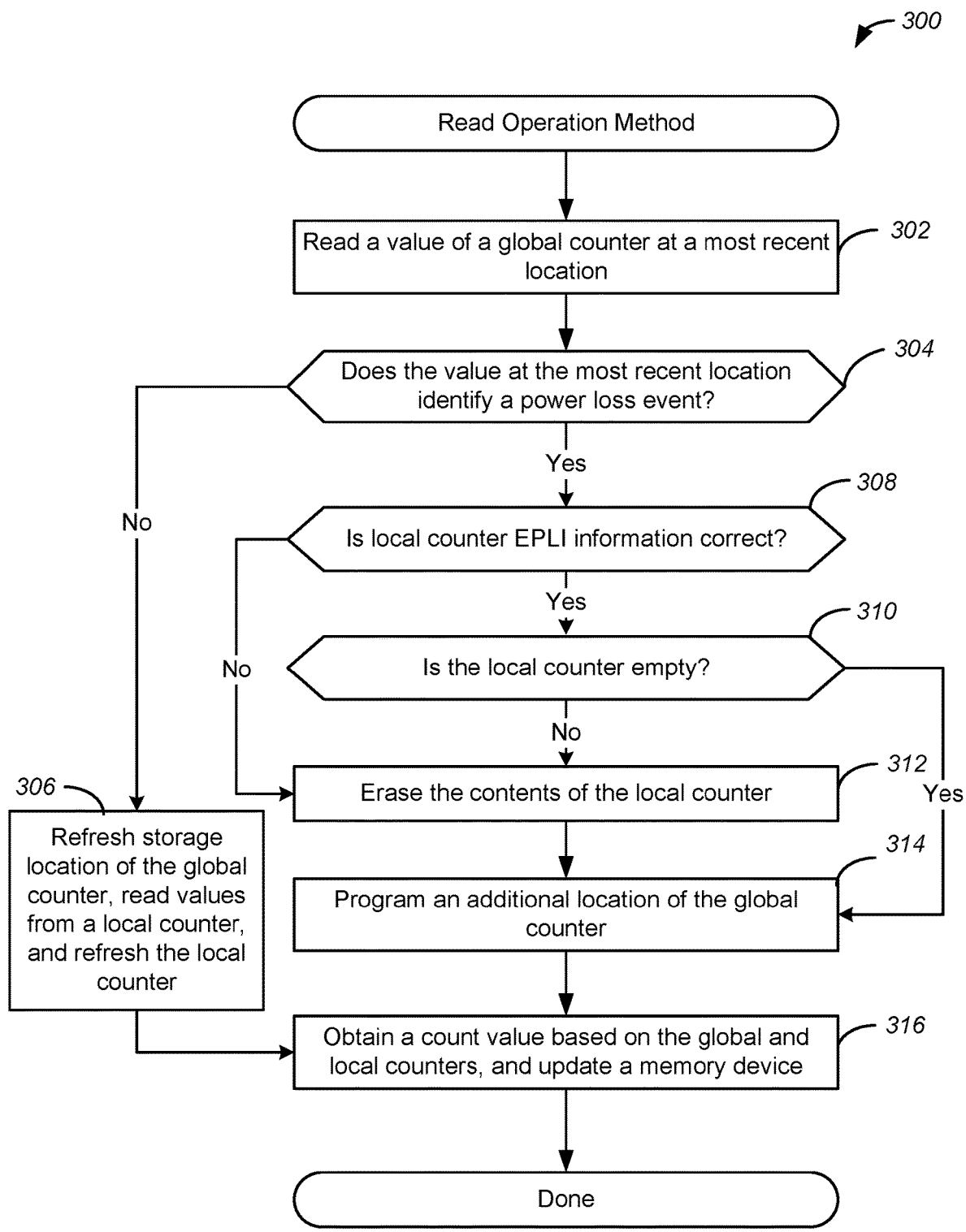
FIG. 3 illustrates a flow chart of an example of a read operation method, implemented in accordance with some embodiments.

FIG. 3 illustrates a flow chart of an example of a read operation method, implemented in accordance with some embodiments. As discussed above, memory devices may be configured to implement various operations that utilize counters. Moreover, one or more read operations may be implemented to read values from counters and determine a count number. As will be discussed in greater detail below, read operations may be implemented to generate a count number in accordance with the scheme described above, as well as provide immunity against power loss events that may have occurred during the storing of count information.

Accordingly, method 300 may commence with operation 302 during which a value of a global counter may be read at a most recent location. In various embodiments, the most recent location is the current location of the counter that represents the global counter's current count. As discussed herein, a current location may refer to the most recent location that has been updated to identify a count. As discussed above, the global counter may be incremented, at least in part, in response to a local counter being cycled, as may occur when the local counter is full and has reached its maximum count, and is then reset using an erase operation. Accordingly, the current location may be represented as a location or address that may be used to infer a numeric value that represents a number of resets or cycles of the local counters.

Method 300 may proceed to operation 304 during which it may be determined if the value of the most recent location identifies a power loss event. As will be discussed in greater detail below, write operations of a global counter may be implemented in a manner that provides an indication of a power loss event if one has occurred. For example, a global counter may be written to twice for a local counter erasure. More specifically, the global counter may be written to once at a most recent location before the erase operation, and once at a second location after the erase operation. In this way the erase operation may be "sandwiched" by global counter write operations, and two locations of the global counter may be used to represent a single count. Accordingly, as disclosed herein, an odd count or an even count may refer collectively to all underlying storage locations used to represent that particular count. When incremented in this way, a value written to an odd location of the global counter may indicate that the increment was implemented, but a power loss event may have occurred during the erase operations, and the second write operation might not have been implemented. Thus, whether or not the most recent location is odd or even may be used to infer whether or not a power loss event has occurred.

While embodiments herein describe the use of an even or odd determination, any suitable flag may be used. For example, a separate data table may be maintained to store flags that are set when successful erasure operations have been implemented. In this way, the identification of a power loss event based on the global counter is not necessarily constrained to properties, such as an odd or even count, of the most recent location.

Thus, according to various embodiments, if it is determined that the value of the most recent location does not identify a power loss event, method 300 may proceed to operation 306 during which one or more storage locations of the global counter may be refreshed to maintain integrity of stored data values, values may be read from the local counter, such as a current count, and the storage locations of the local counter may also be refreshed. Once operation 306 is complete, method 300 may proceed to operation 316 which is discussed in greater detail below.

Returning to operation 304, if it is determined that the value of the most recent location identifies a power loss event, method 300 may proceed to operation 308 during which an erase power loss indication (EPLI) of a local counter may be verified. In various embodiments, the local counters are configured to maintain EPLI bits which may be used to identify if a local erasure operation was successful. For example, an erasure operation may be assigned a particular set of initial EPLI values and final EPLI values which may be stored by a system component, such as a memory controller or control circuitry. The programmed EPLI values may be later correlated with the EPLI values programmed during an erasure operation. The correlation may be implemented to determine whether execution of the erasure operation was completed, or if a power loss event occurred during execution, and the erasure operation was not completed.

Accordingly, during operation 308, it may be determined if the EPLI bits identify a power loss event or not. If it is determined that an erase power loss indication of a local counter cannot be verified, and the EPLI bits are not valid, method 300 may proceed to operation 312. If it is determined that the erase power loss indication of the local counter can be verified, and the EPLI bits are valid, method 300 may proceed to operation 310.

Accordingly, during operation 310, it may be determined if the local counter is empty. Such a determination may be made If it is determined that the local counter is empty, method 300 may proceed to operation 314. If it is determined that the local counter is not empty, method 300 may proceed to operation 312.

Accordingly, during operation 312, an erasure operation may be implemented for the local counter. Accordingly, the contents of the local counter may be erased and reset to ensure the local counter is ready to implement another cycle of counts. In some embodiments, the erasure operation may be implemented as part of a separate process. For example, during operation 312, an indication that an erasure operation is to be implemented may be generated, and the erasure operation may be implemented after the termination of method 300 as part of an erasure process.

Method 300 may proceed to operation 314 during which an additional location of the global counter may be programmed. Accordingly, a second location of the global counter may be programmed. As discussed above, two storage locations of the global counter may be used per cycle of a local counter, and the use of two such storage locations provides, at least in part, power loss immunity. In this example, the second storage location may be programmed to accurately identify that a local counter has been cycled and erased.

Method 300 may proceed to operation 316 during which a count may be obtained based on the local and global counter, and a counter of an SRAM device may be updated. As discussed above, the current counts of the local and global counters may be used in combination with known parameters of the counters themselves, such as numbers of word lines and counts per word line, to generate a count value. During operation 316, the count value may be sent to one or more other system components, such as a counter of an SRAM device for use with one or more memory operations.

Figure 4:
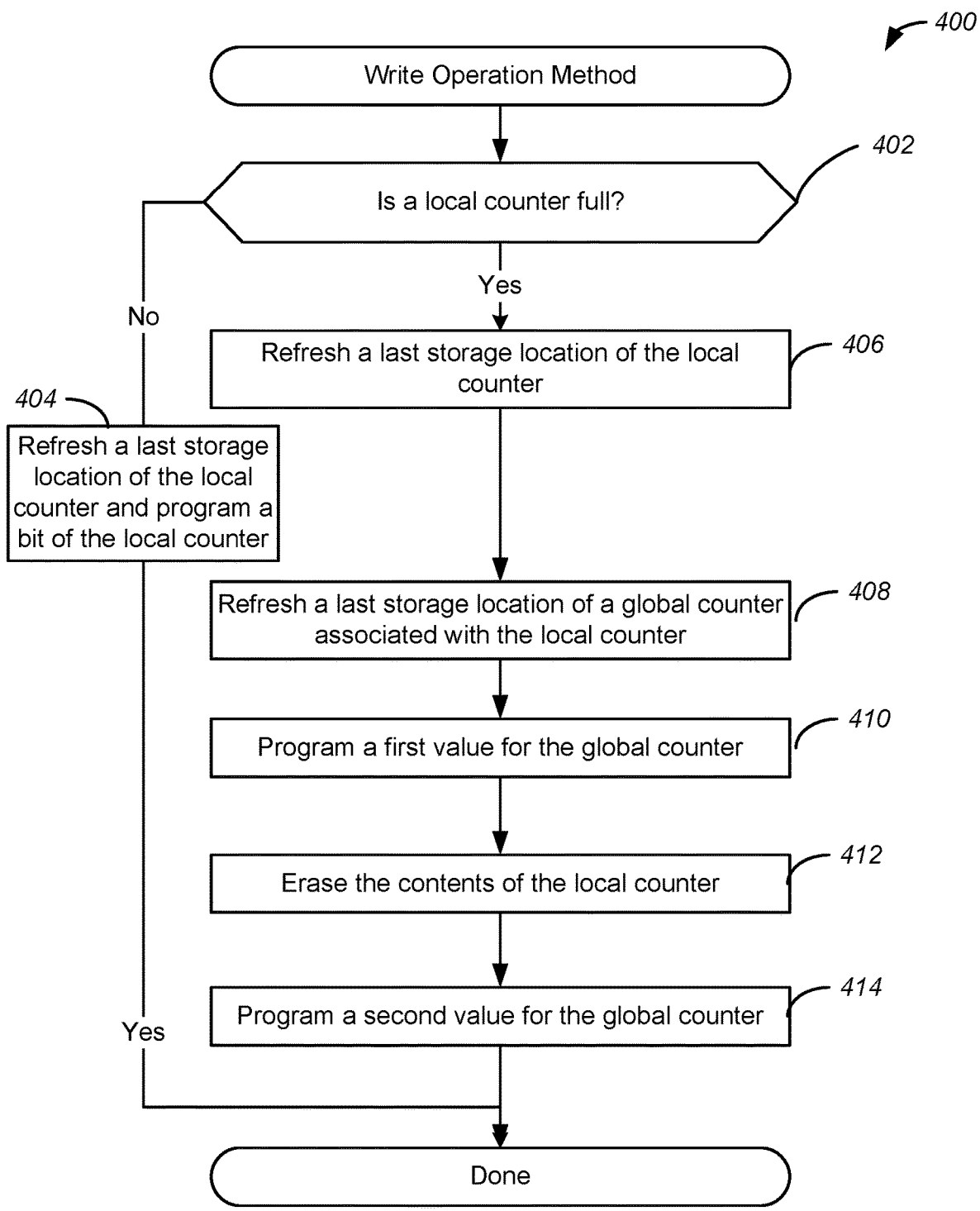
FIG. 4 illustrates a flow chart of an example of a write operation method, implemented in accordance with some embodiments.

FIG. 4 illustrates a flow chart of an example of a write operation method, implemented in accordance with some embodiments. As discussed above, write operations may be implemented to update values stored in counters, such as a global counter. As will be discussed in greater detail below, write operations may be implemented in a manner that provides fault tolerance for power loss events.

Accordingly, method 400 may commence with operation 402 during which it may be determined if a local counter is full. Such a determination may be made based on identifying the current storage location and current count of the local counter, and determining if that is the last storage location of the local counter, as may be determined based on physical parameters, such as a size, of the local counter.

If it is determined that a local counter is not full, method 400 may proceed to operation 404. Accordingly, during operation 404, a last storage location may be refreshed and a local count may be updated and programed. In this way, the local counter may have values refreshed to maintain integrity of the data stored in the local counter, and the local counter may be programmed to update its count.

Returning to operation 402, it if is determined that a local counter is full, method 400 may proceed to operation 406 during which a last local address may be refreshed. As similarly discussed above, the local counter may have values refreshed to maintain integrity of the data stored in the local counter. Accordingly, even if the local counter is determined to be full, the last local address may be refreshed. In some embodiments, the implementation of such a refresh operation ensures integrity of the programming of the bit, prevents the last local address from being an unreliable value, and thus prevents a breach in monotonicity.

Method 400 may proceed to operation 408 during which a last global address of a global counter may be refreshed. As discussed above, the global counter may be associated with the local counter and may be used to count cycles of the local counter. During operation 408, a last global address may be refreshed to maintain integrity of the data stored in the global counter.

Method 400 may proceed to operation 410 during which a first value may be programmed for the global counter. As similarly discussed above, this may be a first value or flag that is used to indicate that an erase operation has been initiated for a local counter, and to track a number of erase operations that have occurred. The programming of the first value may be stored at an odd address or location of the global counter.

Method 400 may proceed to operation 412 during which the local counter may be erased. Accordingly, an erasure operation may be implemented and the values stored in the local counter may be reset. As will be discussed in greater detail below with reference to additional embodiments, the erasure operation may be implemented separately. Accordingly, during operation 408, an indication that an erasure operation is to be implemented may be generated, and the erasure operation may be implemented as part of a separate process subsequent to method 400.

Method 400 may proceed to operation 414 during which a second value may be programmed for the global counter. As similarly discussed above, this may be a second value or flag that is used to indicate that an erase operation has been completed for a local counter. The programming of the second value may be stored at an even address or location of the global counter. Accordingly, the successful programming of both the first value and the second value may be implemented at an odd and even storage location or address respectively, and the two values collectively represent an indication that a count was implemented, and that an erase operation was successfully initiated and completed for a local counter associated with the global counter.

Figure 5:
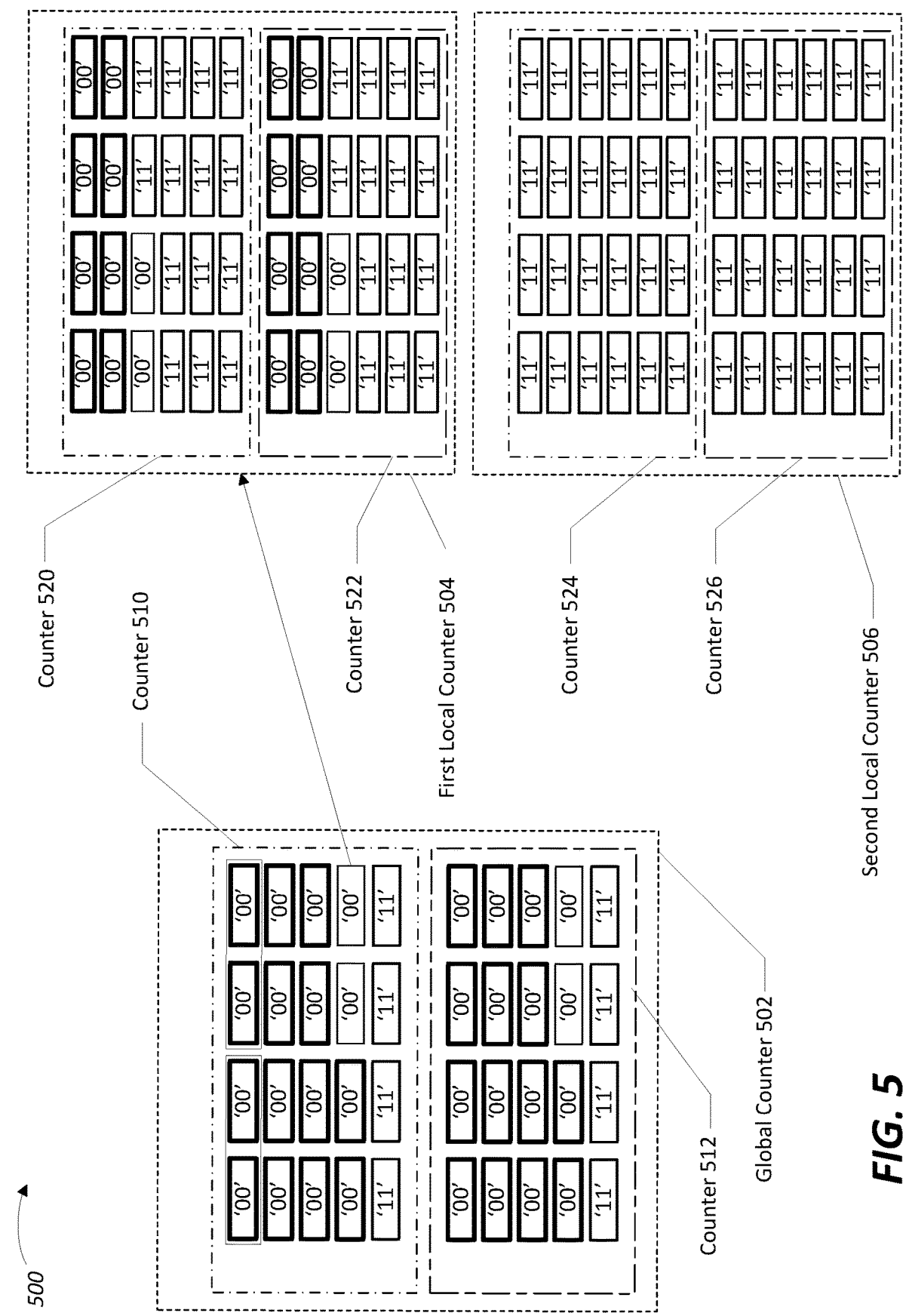
FIG. 5 illustrates another example of monotonic counters, configured in accordance with some embodiments.

FIG. 5 illustrates another example of monotonic counters, configured in accordance with some embodiments. As discussed above, memory devices may include bit counters, such as counters 500, that are used to implement counting operations and maintain a count number. In various embodiments, counters 500 may be configured to include additional or sub-regions of memory that are used to implement redundant storage of count information stored by the counters. In this way, counters 500 implemented within a memory device are configured to achieve high count numbers with relatively low area cost, and are further configured to provide additional immunity to power loss events and data corruption.

In various embodiments, counters 500 include multiple counters, such as global counter 502, first local counter 504, and second local counter 506. As similarly discussed above with reference to FIGS. 2A and 2B, such counters are configured to include various storage locations, also referred to as addresses. For example, the counters may each include an array of memory cells configured to store data values used to track counting operations and count numbers. As shown in FIG. 5, each of the storage locations may be programmed to an initial value, and each counting operation may cause the change of a value in a memory cell to switch to a programmed value. More specifically, an initial value may be a "high" value such as a value of "1", and a programmed value may be a "low" value such as a value of "0". In this way, values stored in the counters may be used to track counting operations associated with memory address generation.

In one example, first local counter 504 and second local counter 506 configured to be programmed responsive to a counting operation. Accordingly, each time a count operation is implemented by a memory system, a local counter may be incremented to track the count number. Moreover, global counter 502 is configured to be updated responsive to a local counter being filled and reset. As will be discussed in greater detail below, when a local counter reaches its maximum count number, it may be erased and reset, and the global counter may be programmed and updated.

As shown in FIG. 5, each local counter may be divided into multiple portions. For example, first local counter 504 and second local counter 506 may each be divided into a first portion and a second portion, where the first portion is a primary counter also referred to herein as a major counter, and where the second portion is a secondary counter also referred to herein as a shadow counter. In various embodiments, the division of a local counter may be implemented by dividing a portion of memory used to implement the local counter, such as a small memory sector, into two physical sub-arrays. As will be discussed in greater detail below, a major counter may be a primary active counter and a shadow counter may be a secondary redundant counter used to ensure data integrity. More specifically, data written to and stored in the first counter, such as counter 520, may be mirrored in the second counter, such as counter 522. It will be appreciated that second local counter 506 may also include a major counter and a shadow counter such as counter 524 and counter 526.

In various embodiments, a global counter, such as global counter 502, is configured to utilize multiple local counters, such as first local counter 504 and second local counter 506. For example, global counter 502 may include counter 510, and may cycle between first local counter 504 and second local counter 506 on alternate counts. For example, first local counter 504 may be used for even counts, and second local counter 506 may be used or odd counts. As described herein, an even count or an odd count may refer to an entire counting operation. More specifically, and as will be discussed in greater detail below with reference to FIG. 9, a count may include the writing and programming of multiple data values to ensure data integrity. As shown in FIG. 5, two addresses or storage locations are used for each count. In various embodiments, global counter 502 may further include counter 512 that is configured as a redundant storage location, that may be a shadow counter that mirrors the primary counter of global counter 502. In various embodiments, a number of counters may be dynamically scaled based on the needs of a memory device.

As similarly discussed above, the values stored in the counters may be data values such as a "high" value or a "low" value, or any other suitable flag, such as one of or combinations of data values such as "1" or "0". In this way, the data values stored in memory are not actual count values, but are flags that are used to compute such actual count values dynamically. In this way, the stored representation of count values is reduced, and memory utilized to store and maintain count information is reduced.

Figure 6:
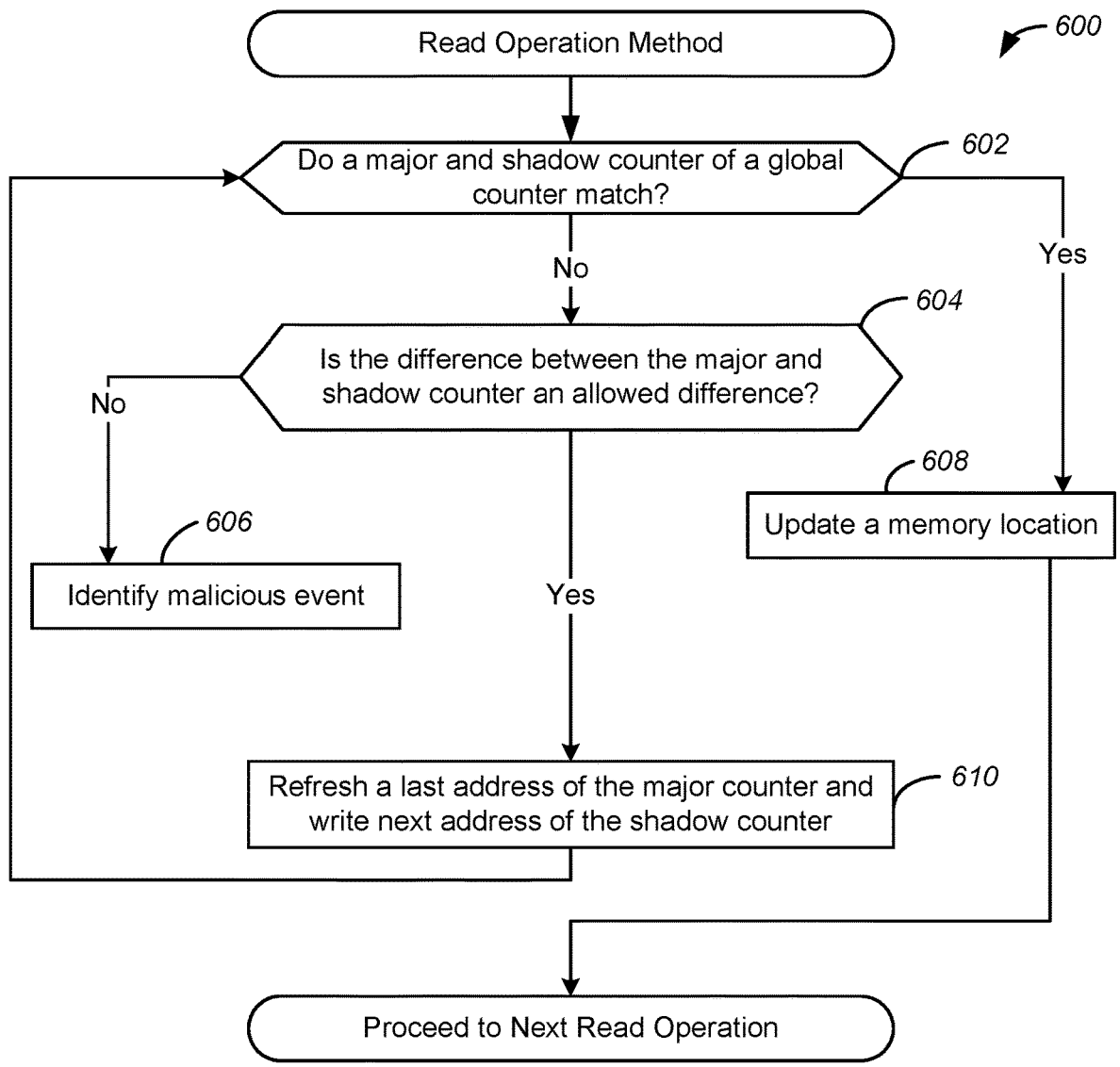
FIG. 6 illustrates an example of another read operation method, implemented in accordance with some embodiments.

FIG. 6 illustrates an example of another read operation method, implemented in accordance with some embodiments. As discussed above, memory devices may be configured to implement various operations that utilize counters. Moreover, one or more read operations may be implemented to read values from counters and determine a count number. As will be discussed in greater detail below, read operations may be implemented to generate a count number in accordance with the scheme described above, as well as provide immunity against power loss events that may have occurred during the storing of count information.

Accordingly, method 600 may commence with operation 602 during which it may be determined if a major counter of a global counter matches a shadow counter of the global counter. In various embodiments, a current count value, also referred to as a most recent value, of the major counter may be compared against that of a shadow counter. While major and shadow counters are disclosed herein, such counters are examples and may also be referred to as first and second global counters. Accordingly, the stored values representing a most recent count of the major and shadow counters may be compared to see if they match. If it is determined that the values match, method 600 may proceed to operation 608 during which a memory location may be updated, and method 600 may proceed an additional read operation discussed in greater detail below, with reference to FIG. 7.

If it is determined that the current values of the major and shadow counters do not match, method 600 may proceed to operation 604 to see if the difference between the major and shadow counters is an allowed difference that can be reconciled, or if the difference is irreparable, and cannot be corrected. For example, an identified difference may be repairable if it can be inferred that an erase operation was implemented and a major counter was updated, but a power loss event occurred prior to the programming of a shadow counter causing a mismatch in values. Accordingly, during operation 604, it may be determined if a current value of a current location or address of the major counter is greater than a current value of a current location or address of the shadow counter by a designated value or amount.

More specifically, if may be determined if the value of the current location of the major counter is greater than a value of the current location of the shadow counter by one. In one example, a current location may be a location identified by an index such as N, and a current location incremented by one may be a location identified by an index such as N+1.

Accordingly, if a current value of the current location of the major counter is N, and a current value of the shadow counter is N−1, the current value of the current location of the major counter may be determined to be greater than the current value of the current location of the shadow counter by the designated value. In some embodiments, the current value of the major counter, may be compared with a current value of the shadow counter as well as an additional value of the shadow counter, such as a current location plus two. Such an additional comparison may be implemented to provide additional confirmation as to whether or not the current location for the major counter is greater than the current location of the shadow counter by specifically one index.

In some embodiments, such values may occur if using data values or flags as discussed above with reference to FIG. 5, and if a power loss event or other event occurs during a global counter incrementation and erasure of a local counter. More specifically, the major counter may have been updated and programmed to identify a completion of an erasure operation, but a power loss event may have occurred which prevented the appropriate programming of the shadow counter as well. Such a situation may be an allowed difference because it may be corrected by subsequently programming the appropriate bit of the shadow counter.

If it is determined that the current value of the current location or address of the major counter is not greater than the current value of the current location or address of the shadow counter by a designated value, such as one, method 600 may proceed to operation 606 during which a malicious event may be identified, and method 600 may terminate. Moreover, a notification message may be generated that may be sent to another system component to identify that such an event has occurred.

Returning to operation 604, if it is determined that the value of the current location or address of the major counter is greater than the value of the current location or address of the shadow counter by the designated value, such as one, method 600 may proceed to operation 610 during which the last address of the major counter may be refreshed and the next address of the shadow counter may be written. In this way, the data values stored in the shadow counter, implemented as the shadow counter, may be updated based on the data values stored in the major counter, and in a manner that restores data after a power loss event. Once operation 610 has been completed, method 600 may return to operation 602, the major and shadow counters may be compared, and a memory location may be updated, as described above.

Figure 7:
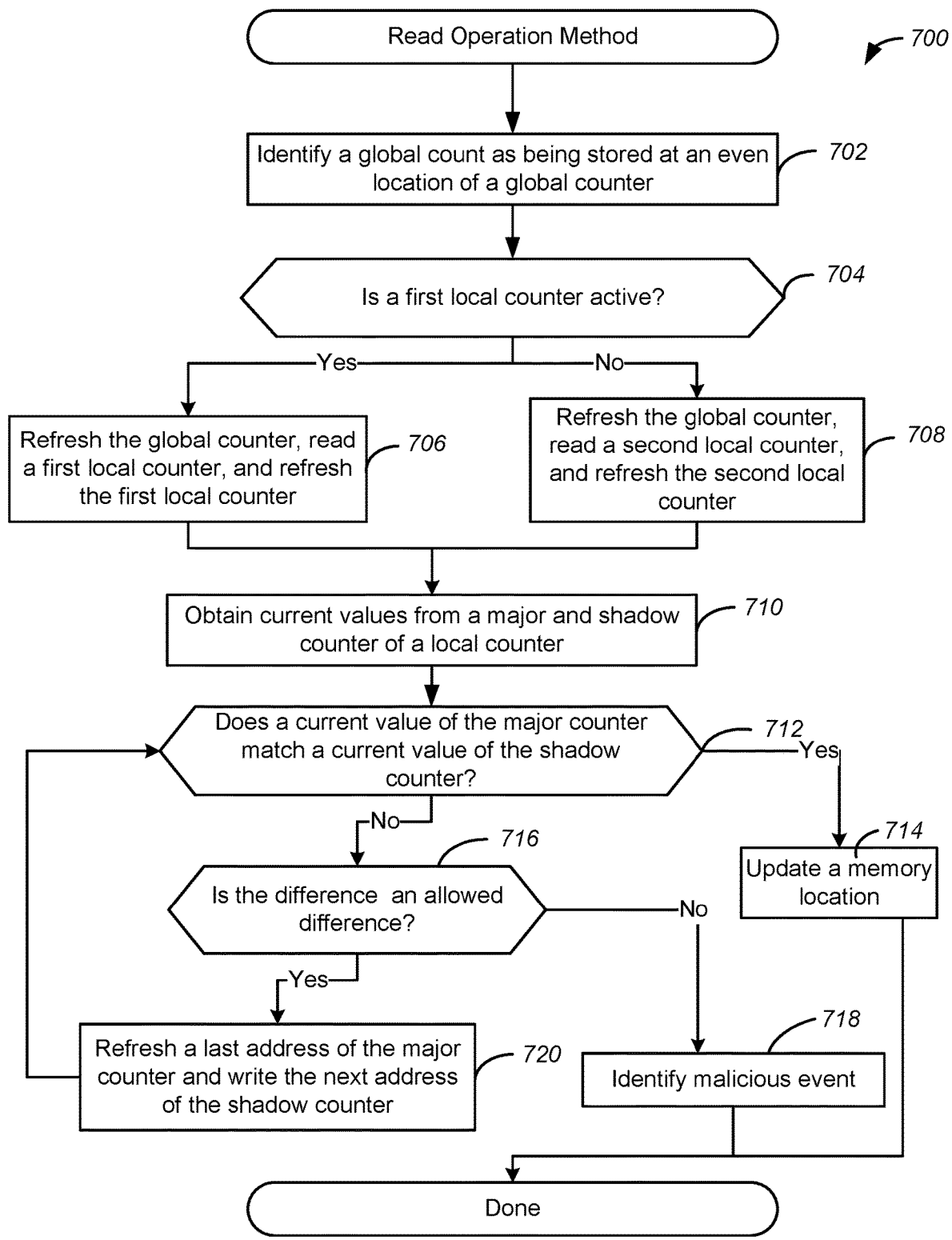
FIG. 7 illustrates an example of yet another read operation method, implemented in accordance with some embodiments.

FIG. 7 illustrates an example of yet another read operation method, implemented in accordance with some embodiments. As discussed above, read operations may be implemented to generate a count number in accordance with the scheme described above, as well as provide immunity against power loss events that may have occurred during the storing of count information. As will be discussed in greater detail below, various operations may be implemented in response to identifying the presence of a power loss event during a count operation. In various embodiments, a method, such as method 700, may be implemented when a global counter count is identified as located at an even location, and no power loss event is detected at a global counter level.

Accordingly, method 700 may commence with operation 702 during which it may be determined if the global count is stored at an even location. Accordingly, as discussed above with reference to FIG. 6, a current location of a global counter may be identified, and it may be determined if the current location is an odd location or an even location. Such a determination may be made based on whether or not the storage location has an odd or even address. Thus, if the current count is stored at an odd location, method 700 may proceed to additional operations described with reference to FIG. 8. If the current count is stored at an even location, method 700 may proceed to operation 704.

Accordingly, method 700 may proceed to operation 704 during which if may be determined which counter is active. Such a determination may be made, for example based on whether or not the global count is an odd count or an even count. As discussed above, a global counter may implement count operations where two storage locations are used for each count. More specifically, the first storage location is used at the onset of a count operation and an erasure of an associated local counter, and the second storage location is used once the erasure is complete. As discussed above, each global count includes programming an odd then even location, also referred to herein as an address, of a counter. For example, locations such as 1, 3, 5, . . . may be odd locations and locations 2, 4, 6, . . . may be even locations. A completed global count ends with an even location because two bits are programmed when implemented successfully (otherwise, it may be indicative of a power loss event during erasure of a local counter). Therefore, as described above with reference to FIG. 5, odd global counts will be stored using locations 1 and 2, 5 and 6, 9 and 10, . . . , while even global counts are stored at locations 3 and 4, 7 and 8, 11 and 12, . . . . In this way, the location or address of a last bit of a global count may be mapped to an odd or event count, and may identify and point to an active local counter. Accordingly, during operation 704, one or more numerical features of the current location of the global counter may be used to identify whether or not the global count is odd or even. As discussed above, whether or not a count is odd or even may be used to identify which local counter is active.

If it is determined that the first local counter is active, method 700 may proceed to operation 706 during which addresses of a first local counter may be read and refreshed. As discussed above, the determination that the first local counter is active may be made by identifying an even global count. In this way, refresh operations may be implemented to maintain integrity of data values stored in both the global and first local counters, and count values may be read from the first local counter.

Returning to operation 704, if it is determined that the second local counter is active, method 700 may proceed to operation 708 during which addresses of a second local counter may be read and refreshed. In this way, refresh operations may be implemented to maintain integrity of data values stored in both the global and second local counters, and count values may be read from the second local counter.

Method 700 may proceed to operation 710 during which current values may be obtained from major and shadow counters included in the local counter. Accordingly, during operation 710, the current values of both the major and shadow counters of the global counter may be identified and retrieved.

Method 700 may proceed to operation 712 during which it may be determined if the current value of the major counter matches the current value of the shadow counter of the local counter. In this way, the current values of the major and shadow counters may be compared to see if they match. If it is determined that the values match, method 700 may proceed to operation 714 during which a memory location may be updated, and method 700 may terminate. However, if it is determined that the values do not match, method 700 may proceed to operation 716.

Accordingly, during operation 716 it may be determined if a difference between the major and shadow counters is an allowed difference. For example, it may be determined if a current value of a current location or address of the major counter is greater than a current value of a current location or address of the shadow counter by a designated value. More specifically, if may be determined if the current value of the major counter is greater than the current value of the shadow counter by one. Moreover, the value of a current location of a major counter may be compared with an additional value of the shadow counter such as the current location incremented by two, as previously discussed.

If it is determined that the value of the current location of the major counter does not equal the value of the shadow counter at its current location incremented by a designated value, such as one, method 700 may proceed to operation 718 during which a malicious action or power failure event may be identified. Moreover, a notification message may be generated that may be sent to another system component to identify that such an event has occurred, and method 700 may terminate.

Returning to operation 716, if it is determined that the value of the current location of the major counter does equal the value of the shadow counter at its current location incremented by a designated value, such as one, method 700 may proceed to operation 720 during which the last address of the major counter may be refreshed and the next address of the shadow counter may be written. In this way, the data values stored in the shadow counter, implemented as the shadow counter, may be updated based on the data values stored in the major counter, and in a manner that restores data after a power loss event. Once operation 720 has been completed, method 700 may return to operation 712, and the major and shadow counters may be compared and a memory location may be updated, as described above.

Figure 8:
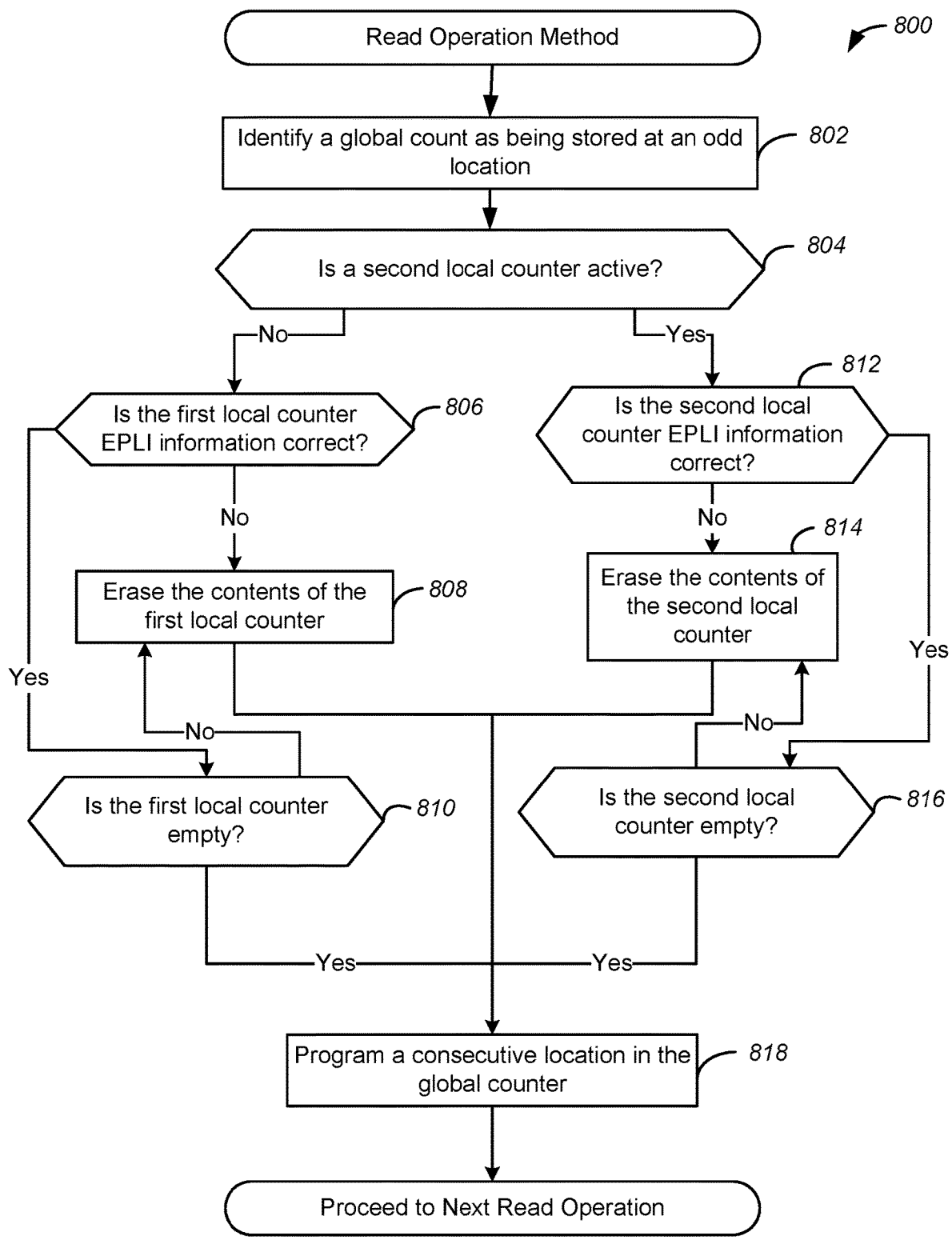
FIG. 8 illustrates an example of an additional read operation method, implemented in accordance with some embodiments.

FIG. 8 illustrates an example of an additional read operation method, implemented in accordance with some embodiments. As discussed above, read operations may be implemented to generate a count number in accordance with the scheme described above, as well as provide immunity against power loss events that may have occurred during the storing of count information. As will be discussed in greater detail below, various operations may be implemented in response to identifying the presence of a power loss event during a count operation. In various embodiments, a method, such as method 800, may be implemented when a global counter count is identified as located at an even location, and no power loss event is detected at a global counter level.

Accordingly, method 800 may commence with operation 802 during which it may be determined if the global count is stored at an odd location. Accordingly, as discussed above with reference to FIGS. 6 and 7, a current location of a global counter may be identified, and it may be determined if the current location is an odd location or an even location. Such a determination may be made based on whether or not the storage location has an odd or even address. Thus, if the current count is stored at an even location, method 800 may proceed to additional operations previously described with reference to FIG. 7. If the current count is stored at an odd location, method 800 may proceed to operation 804.

Accordingly, during operation 804, it may be determined if the global count is an odd count or an event count. As discussed above, a global counter may implement count operations where two storage locations are used for each count. Accordingly, during operation 804, one or more numerical features of the current location of the global counter may be used to identify whether or not the global count is odd or even. As discussed above, whether or not a count is odd or even may be used to identify which local counter is active.

If it is determined that the global count is an odd count, method 800 may proceed to operation 806 during which it may be determined if EPLI bits of a first local counter are correct. As discussed above, such EPLI bits may be maintained by the first local counter as part of read and write operations, and may be used to identify whether or not a write operation was successful, or encountered a problem such as a power loss event. Accordingly, if it is determined that the EPLI bits are correct, method 800 may proceed to operation 808 during which an erasure operation may be implemented for the first local counter to erase the contents of the first local counter. As similarly discussed above, an indication that an erasure operation may be generated instead if appropriate. If it is determined that the EPLI bits are correct, method 800 may proceed to operation 810 during which it may be determined if the first local counter is empty. If there is no data stored in the first local counter and the first local counter is empty, method 800 may proceed to operation 818 which will be discussed in greater detail below. Moreover, if it is determined that the first local counter is not empty, method 800 may proceed to operation 908 discussed above to implement an appropriate erasure operation.

Retuning to operation 804, it is determined that the global count is an even count, method 800 may proceed to operation 812 it may be determined if EPLI bits of a second local counter are correct. If it is determined that the EPLI bits are correct, method 800 may proceed to operation 814 during which an erasure operation may be implemented for the second local counter to erase the contents of the second local counter. As similarly discussed above, an indication that an erasure operation may be generated instead if appropriate. If it is determined that the EPLI bits are correct, method 800 may proceed to operation 816 during which it may be determined if the second local counter is empty. If it is determined that the second local counter is not empty, method 800 may proceed to operation 814 discussed above to implement an appropriate erasure operation. If there is no data stored in the second local counter and the second local counter is empty, method 800 may proceed to operation 818.

Accordingly, during operation 818, a consecutive location may be programmed in the global counter. As discussed above, the successful programming of the second location of the global counter may include the programing of a second bit that indicates that erasure of a local counter has been successfully implemented, and the global counter may be incremented accordingly. Thus, during operation 818 values stored by the global counter may be updated. Moreover, a consecutive location, which may be a bit, of both a major and shadow counter may be updated. Once updated, method 800 may proceed to additional read operations, such as those discussed above with reference to operation 710 of FIG. 7.

Figure 9:
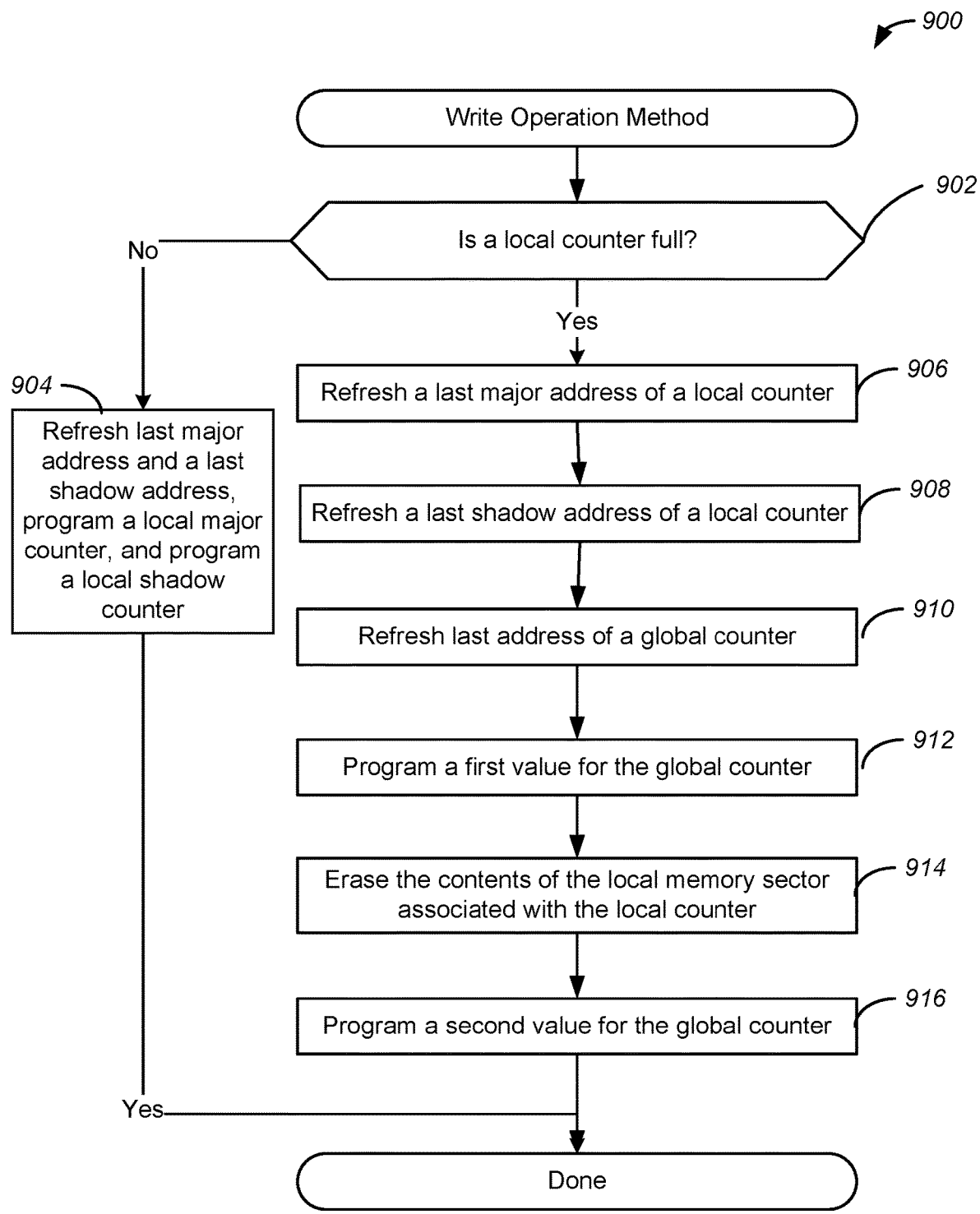
FIG. 9 illustrates an example of another write operation method, implemented in accordance with some embodiments.

FIG. 9 illustrates an example of another write operation method, implemented in accordance with some embodiments. As discussed above, write operations may be implemented to update values stored in counters, such as a global counter. As will be discussed in greater detail below, write operations may be implemented in a manner that provides resistance to power loss events.

Accordingly, method 900 may commence with operation 902 during which it may be determined if a local memory sector is full. If it is determined that a local memory sector is not full, method 900 may proceed to operation 904 during which a last major address and last shadow address of a major counter and a shadow counter of a global counter may be refreshed respectively, and a major counter and a shadow counter of a local counter may be programmed. In this way, data values may be refreshed, and a local counter may be incremented. If it is determined that the local memory sector is full, method 900 may proceed to operation 906.

Accordingly, during operation 906, a last local major address may be refreshed. Thus, a refresh operation may be implemented for the last address of a first counter of a local counter, such as a major counter described above with reference to FIG. 5. Moreover, during operation 908, a last local shadow address may be refreshed. Accordingly, a refresh operation may be implemented for the last address of a second counter of the local counter, such as a shadow counter also described above with reference to FIG. 5. Furthermore, during operation 910 a last address of both the major and shadow counter of the global counter may be refreshed. As similarly discussed above, the refresh operation may maintain integrity of the data values stored in the global counter.

Method 900 may proceed to operation 912 during which a first value may be programmed for the global counter. As discussed above, a first programming operation may be implemented to program a first value that identifies the onset of a local counter erasure and the implementation of an erasure operation. Accordingly, during operation 910, the first value may be programmed at a major address and corresponding shadow address of the global counter.

Method 900 may proceed to operation 914 during which the local memory sector associated with the local counter may be erased. Accordingly, one or more erasure operations may be implemented to erase the contents of the local memory sector. As discussed above, a notification may instead be generated that is configure to implement the erasure operation subsequent to method 900.

Method 900 may proceed to operation 916 during which a second value may be programmed for the global counter. As discussed above, a second programming operation may be implemented to program a second value that identifies the completion of local counter erasure. Accordingly, during operation 916, the second value may be programmed at a major address and a corresponding shadow address of the global counter.

Figure 10:
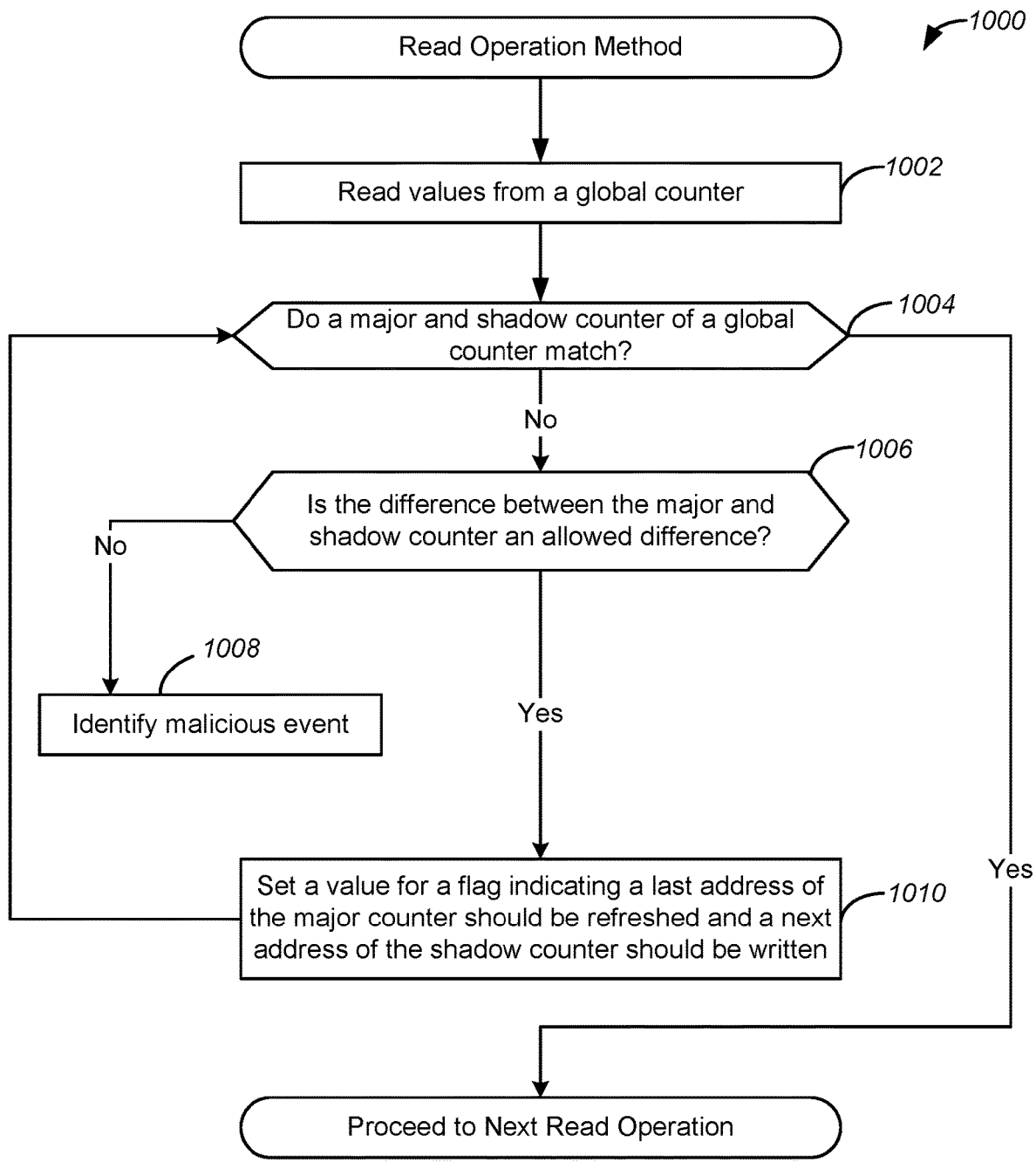
FIG. 10 illustrates an example of another read operation method, implemented in accordance with some embodiments.

FIG. 10 illustrates an example of another read operation method, implemented in accordance with some embodiments. As discussed above, one or more read operations may be implemented to read values from counters and determine a count number. As will be discussed in greater detail below, various write operations, such as refresh, program, and erase operations, may be selectively implemented and/or delayed to accommodate various performance aspects of a device. For example, a particular memory device may be configured to implement particular write operations separately from read operations, and accordingly, such write operations may be delayed.

Accordingly, method 1000 may commence with operation 1002 during which values may be read from a global counter. As similarly discussed above, current values may be read from a major and a shadow counter of a global counter, such as a major counter and a shadow counter implemented in the global counter. As also similarly discussed above, the global counter may be implemented with local counters, and may cycle between local counters such that a particular local counter is an active counter, and the others are non-active local counters.

Method 1000 may proceed to operation 1004 during which it may be determined if values of a major and shadow counter of the global counter match. Accordingly, the values read from the major and shadow counters may be compared, and it may be determined if they are equal and match. If it is determined that the values match, method 1000 may terminate and additional read operations may be implemented, as discussed below with reference to method 1100.

However, if it is determined that the values do not match, method 1000 may proceed to operation 1006 during which it may be determined if the difference between the values is an allowed difference. For example, it may be determined if a current value of a current location or address of the major counter is greater than a current value of a current location or address of the shadow counter by a designated value, such as one, and is a repairable difference. If it is determined that the difference is not an allowed difference, method 1000 may proceed to operation 1008 during which a malicious event may be identified. In one example, this may be determined if the value of the major counter does not equal the value of the shadow counter at the current address incremented by one.

If it is determined that the difference is an allowed difference, method 1000 may proceed to operation 1010. As discussed above, this may be determined if the value of the current location of the major counter does equal the value of the shadow counter at its current location incremented by a designated value, such as one. Accordingly, during operation 1010, a value may be set for a flag that indicates that additional operations should be implemented at a subsequent time. For example, the flag may indicate that a last address of the major counter should be refreshed, and a next address of the shadow counter should be written at a subsequent and appropriate time. For example, the refresh and write operations may be implemented during a subsequent update command cycle. Once the flag is set, method 1000 may then proceed to additional read operations discussed in greater detail below with reference to FIG. 11.

Figure 11:
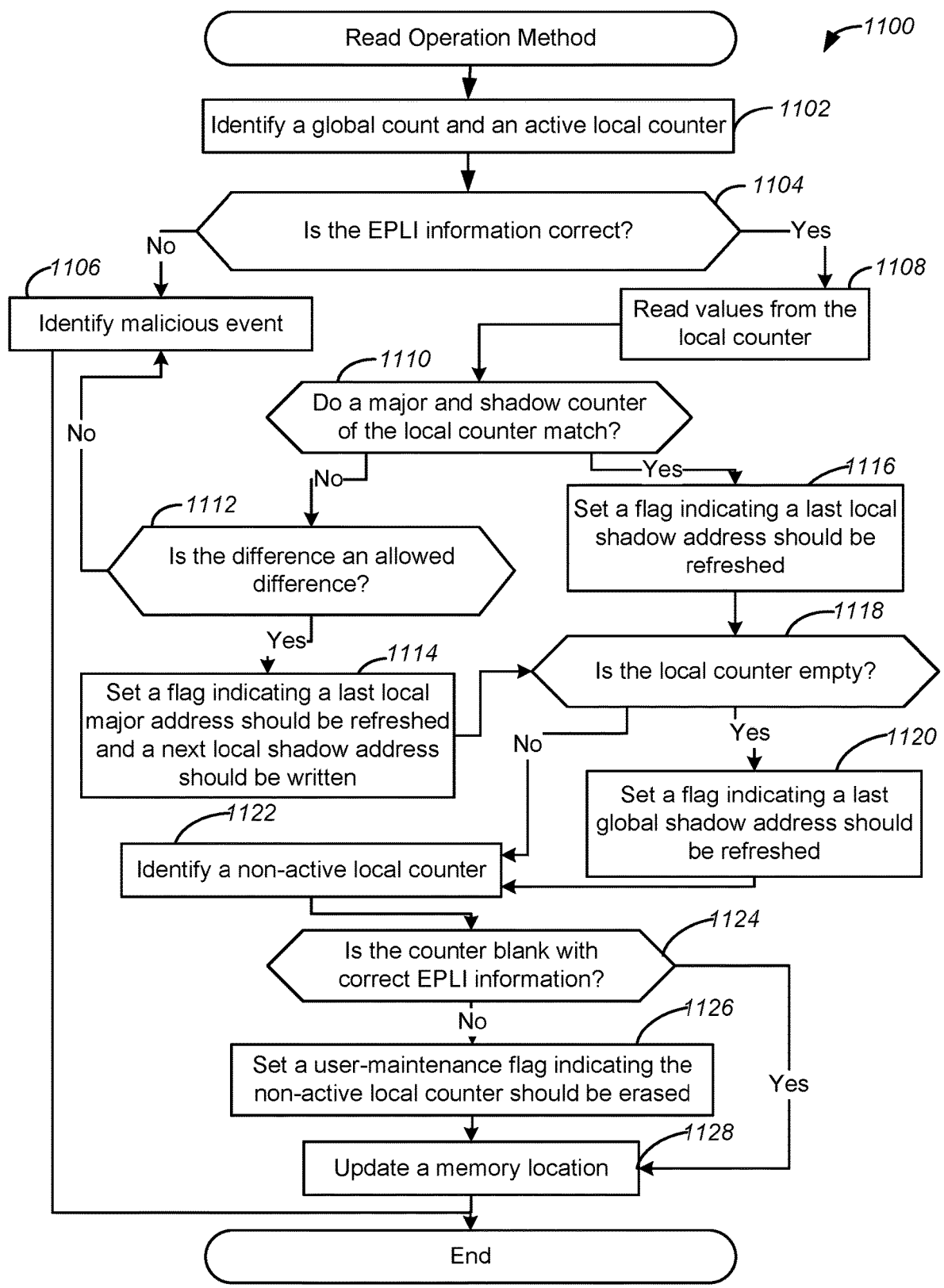
FIG. 11 illustrates an example of yet another read operation method, implemented in accordance with some embodiments.

FIG. 11 illustrates an example of yet another read operation method, implemented in accordance with some embodiments. As similarly discussed above, read operations may be implemented to read values from counters and determine a count number. As will be discussed in greater detail below, various operations may be selectively implemented and/or delayed to accommodate various performance aspects of a device. Accordingly, additional read operations may be implemented, and other operations may be selectively delayed.

Method 1100 may commence with operation 1102 during which a global count and active local counter may be identified. In various embodiments, such a global count and active local counter may be identified based on the values read during method 1000 described above. More specifically, the global count and active local counter may be identified based on the values read from the global counter.

Method 1100 may proceed to operation 1104 during which it may be determined if EPLI information is correct for the active local counter. As similarly discussed above, an active local counter may be identified, and EPLI information associated with a most recent program operation may be verified. If it is determined that the EPLI information is not correct, method 1100 may proceed to operation 1106 during which a malicious event or power loss event may be identified, and a failure notification message may be generated. However, if it is determined that the EPLI information is correct, method 1100 may proceed to operation 1108 during which values may be read from the local counter. Accordingly, values may be read from a major and shadow counter of the local counter.

Method 1100 may proceed to operation 1110 during which it may be determined if values of the major and shadow counter of the local counter match. If it is determined that the values of the major and shadow counters of the local counter do not match, method 1100 may proceed to operation 1112 during which it may be determined if the difference between the major and shadow counter is an allowed difference, and is a difference that can be repaired. Such a determination may be made by determining if the value of the major counter equals a value of the shadow counter at a current address incremented by one.

If it is determined that the difference is not an allowed difference, method 1100 may proceed to operation 1106 during which a malicious event may be identified. For example, the difference may be identified as a difference that cannot be repaired and is not an allowed difference if the value of the major counter does not equal the value of the shadow counter at a current address incremented by one. In such a situation, a malicious event may be identified and a notification message may be generated.

If it is determined that the difference is an allowed difference, method 1100 may proceed to operation 1114 during which a flag may be set. For example, the difference may be identified as a difference that can be repaired and is an allowed difference if the value of the major counter equals the value of the shadow counter at a current address incremented by one. In such a situation, a flag may be set that indicates that a last local major address should be refreshed, and a next local shadow address should be written. As similarly discussed above, the flag is configured to delay the implementation of the refresh and write operations.

Returning to operation 1110, if it is determined that values of the major and shadow counter do match, method 1100 may proceed to operation 1116 during which a flag may be set. In various embodiments, the flag indicates that a last local shadow address should be refreshed at a subsequent time. Note that in case sector is empty, this refresh is irrelevant Method 1100 may proceed to operation 1118 during which it may be determined if the active local counter is empty. Such a determination may be made based on the values previously read from the active local counter as well as known aspects of such values, such as a location or address. If it is determined that the active local counter is not empty, method 1100 may proceed to operation 1122 discussed in greater detail below.

Returning to operation 1118, if it is determined that the active local counter his empty, method 1100 may proceed to operation 1120 during which a flag may be set that indicates that a last global shadow address should be refreshed at a subsequent time, and method 1100 may then proceed to operation 1122 during which a non-active local counter may be identified. As discussed above, there may be multiple local counters, such as a first local counter and a second local counter, and during operation 1122 an additional local counter may be identified that is not currently active and being used for a count operation.

After operation 1122, method 1100 may proceed to operation 1124 during which it may be determined if the non-active local counter is blank and if the EPLI information is correct. As similarly discussed above, such a determination may be made based on the previously read counter values as well as EPLI information stored in the counter.

If it is determined that the counter is not blank or does not have correct EPLI information, method 1100 may proceed to operation 1126 during which a user-maintenance flag may be set that indicates that the non-active local counter should be erased. Moreover, a counter update may be prohibited unless such a user-maintenance operation is performed.

Returning to operation 1122, if it is determined that the counter is blank and has the correct EPLI information, method 1100 may proceed to operation 1128 during which a memory location may be updated. As similarly discussed above, the memory location may be an SRAM location. In this way, a count may be read and provided for the memory device.

Figure 12:
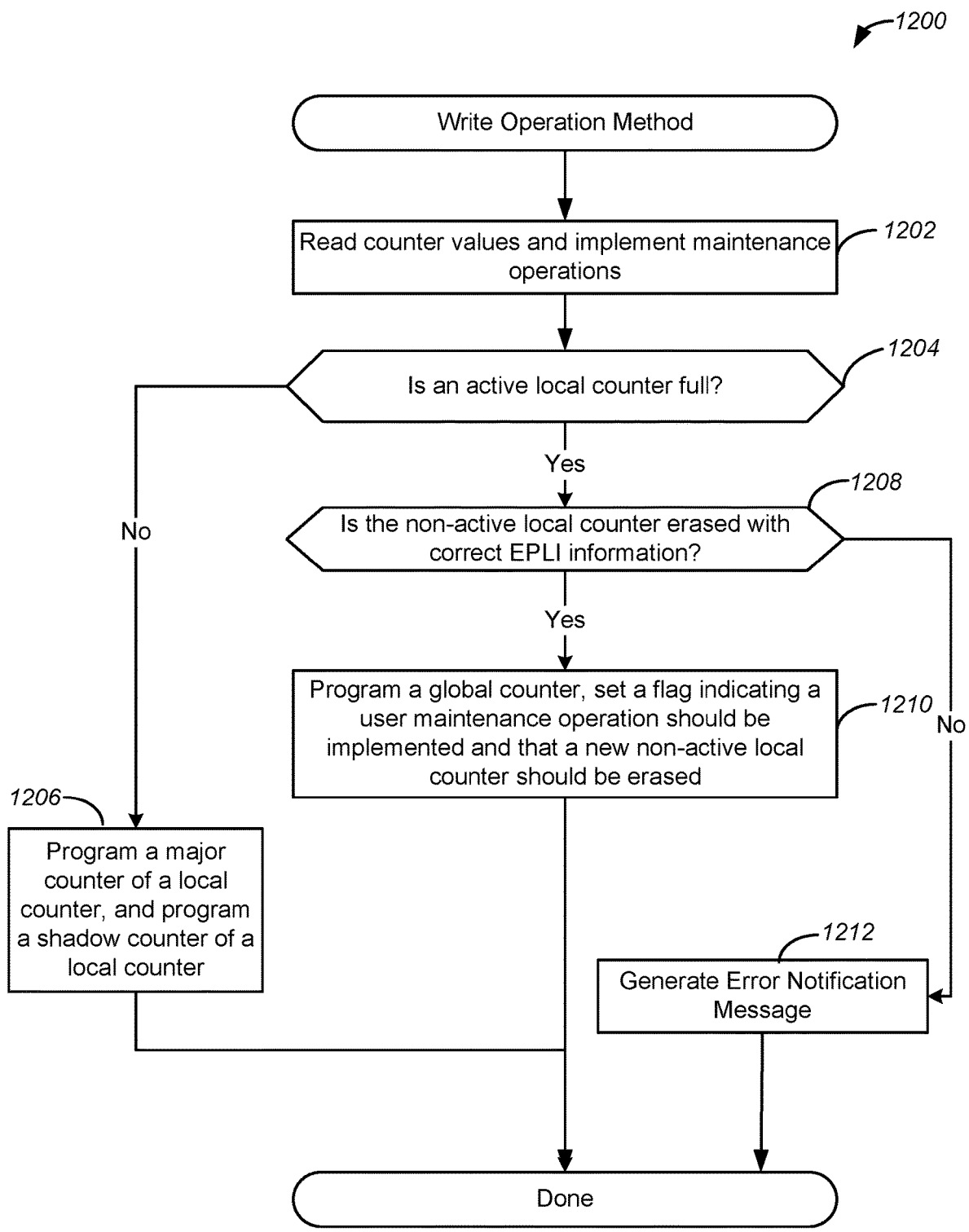
FIG. 12 an example of another write operation method, implemented in accordance with some embodiments.

FIG. 12 an example of another write operation method, implemented in accordance with some embodiments. As discussed above, write operations may be implemented to update values stored in counters, such as a global counter. As will be discussed in greater detail below, write operations may be implemented in a manner that provides resistance to power loss events. As will be discussed in greater detail below, various operations, such as erase operations, may be selectively implemented and/or delayed to accommodate various performance aspects of a device.

Method 1200 may commence with operation 1202 during which counter values may be read and maintenance operations may be implemented. As similarly discussed above, current values may be read from local counters, and program and/or refresh operations may be implemented if appropriate. In this way, current information may be retrieved about local counters, and data integrity may be maintained.

Method 1200 may proceed to operation 1204 during which it may be determined if an active local counter is full. In various embodiments, an active local counter may be a local counter that is currently being used for a count operation, and a non-active local counter may be a local counter that is not being used. Accordingly, there may be various local counters, such as a first local counter and a second local counter discussed above, and they may be alternatively selected to be cycled between being active and non-active. In various embodiments, such a determination may be made based on values retrieved during operation 1202. Accordingly, if it is determined that an active local counter is not full, method 1200 may proceed to operation 1206 during which a major counter of the local counter may be programmed, and a shadow counter of the local counter may also be programmed. Returning to operation 1204, if it is determined that an active local counter is full, method 1200 may proceed to operation 1208 during which it may be determined if a non-active local counter has been erased and has correct EPLI information.

If it is determined that the non-active local counter has been erased and has correct EPLI information, method 1200 may proceed to operation 1210 during which a global counter may be programmed, a flag may be set that indicates that user maintenance should be implemented, and that a new non-active local counter (the counter that was previously active) may be erased. In this way, a flag may be set for user-maintenance operations, and such user-maintenance operations may be delayed and subsequently implemented at an appropriate time.

Returning to operation 1208, if it is determined that the non-active local counter has not been erased and has correct EPLI information, method 1200 may proceed to operation 1212 during which an error notification may be generated, and a counter update may be prohibited prior to the application of the user-maintenance operation. Method 1200 may subsequently terminate.

Figure 13:
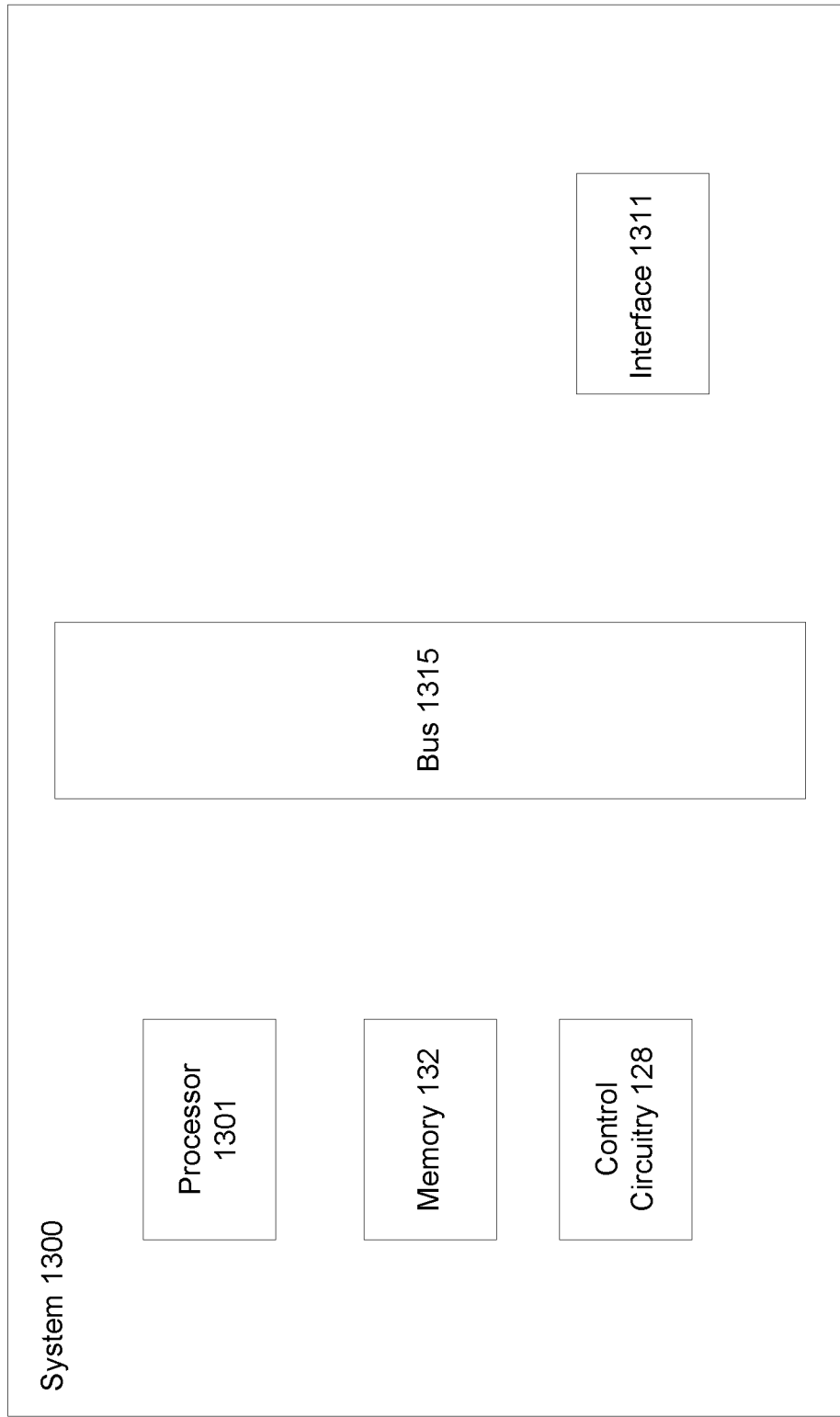
FIG. 13 illustrates an example of a memory system that may include a memory device, configured in accordance with some embodiments.

FIG. 13 illustrates an example of a memory system that may include a memory device, configured in accordance with some embodiments. According to particular example embodiments, system 1300 may be suitable for implementing various components described above, such as memory device 100 as well as the monotonic counters described above. In various embodiments, system 1300 may include processor 1301 which may be configured to implement one or more processing operations. For example, processor 1301 may be configured to implement read and write operations associated with memory array 132. System 1300 may also include bus 1315 which may be configured to enable communication between various components of system 1300.

In various embodiments, system 1300 may further include memory array 132 and control circuitry 128 which may be configured to implement the monotonic counters discussed above. In various embodiments, control circuitry 128 may include one or more processors and dedicated memory that may be configured to implement the previously described count incrementations as well as read and write operations. In this way, system 1300 may have a dedicated processing unit, such as control circuitry 128, which may be configured to implement the previously described count incrementations as well as read and write operations. Moreover, in some embodiments, control circuitry 128 may be implemented in an application specific integrated circuit (ASIC), or may be implemented in reprogrammable logic of a field programmable gate array. In some embodiments, control circuitry 128 may be implemented in a programmable system or controller that further includes a non-volatile memory, such as a Programmable System On a Chip or PSoC™ controller, commercially available from Cypress Semiconductor of San Jose, California. In various embodiments, one or more components of system 1300 may be implemented on the same circuit die and in the same package. For example, control circuitry 128 and memory 132 may be implemented on the same circuit die. In some embodiments, they may be implemented on different dies and in different packages.

In various embodiments, communications interface 1311 may be configured to send and receive data to other system components, or may be configured to send and receive packets or data segments over a network. For example, communications interface 1311 may be communicatively coupled to a user interface device via a bus, such as bus 1315, or via a communications network. As discussed above, communications interface 1311 may be configured to receive data from such a user interface device which may be included in a data processing system or computer system. In various embodiments, such data may include an input identifying wear leveling parameters from a user. In various embodiments, communications interface 1311 may be a device that supports Ethernet interfaces, frame relay interfaces, cable interfaces, and DSL interfaces. In addition, various very high-speed interfaces may be provided such as fast Ethernet interfaces, Gigabit Ethernet interfaces, HSSI interfaces, POS interfaces, FDDI interfaces and the like. Generally, these interfaces may include ports appropriate for communication with the appropriate media. In some cases, they may also include an independent processor and, in some instances, volatile RAM.

Although the foregoing concepts have been described in some detail for purposes of clarity of understanding, it will be apparent that certain changes and modifications may be practiced within the scope of the appended claims. It should be noted that there are many alternative ways of implementing the processes, systems, and devices. Accordingly, the present examples are to be considered as illustrative and not restrictive.

What is claimed is:

1. A system comprising:
    a non-volatile memory device comprising:
        a first counter configured to store a first plurality of data values representing a plurality of count operations;
        a second counter configured to store a second plurality of data values representing an initiation and a completion of each erase operation performed on the first counter such that at least two data values are stored in the second counter to identify a success or failure of each erase operation of the first counter based on their data values and further represent a partial count value; and
    control circuitry configured to:
        generate a count value based on a current counter value of the first counter, a current counter value of the second counter, and at least one physical parameter of the first counter.

2. The system of claim 1, wherein the at least one physical parameter comprises a size of a memory sector configured to implement the first counter.

3. The system of claim 1, wherein the control circuitry is further configured to:
    implement an erase operation for the first counter in response to the first counter being full.

4. The system of claim 3, wherein the second counter is configured to:
    store a first value when an erase operation of the first counter is initiated; and
    store a second value when the erase operation is completed.

5. The system of claim 1, wherein the first counter is divided into a first portion and a second portion.

6. The system of claim 5, wherein the first portion is a primary counter, and wherein the second portion is a secondary counter that is configured to mirror the first portion.

7. The system of claim 6, wherein the second counter is divided into a third portion and a fourth portion, wherein the third portion is a primary counter, and wherein the fourth portion is a secondary counter that is configured to mirror the third portion.

8. The system of claim 5, wherein the control circuitry is further configured to:
    implement an erase operation for both the first portion and the second portion in response to determining that the first counter should be erased.

9. The system of claim 1, wherein the control circuitry is further configured to:
    identify a malicious event or a power loss event based, at least in part, on the second plurality of data values.

10. A method comprising:
    storing, in a first counter of a non-volatile memory device, a first plurality of data values representing a plurality of count operations;
    storing, in a second counter of the non-volatile memory device, a second plurality of data values representing an initiation and a completion of each erase operation performed on the first counter such that at least two data values are stored in the second counter to identify a success or failure of each erase operation of the first counter based on their data values and further represent a partial count value; and generating, using one or more processors, a count value based on a current counter value of the first counter, a current counter value of the second counter, and at least one physical parameter of the first counter.

11. The method of claim 10, wherein the at least one physical parameter comprises a size of a memory sector configured to implement the first counter.

12. The method of claim 10 further comprising:
storing a first value when an erase operation of the first counter is initiated; and
storing a second value when the erase operation is completed.

13. The method of claim 10, wherein the first counter is divided into a first portion and a second portion, wherein the first portion is a primary counter, and wherein the second portion is a secondary counter that is configured to mirror the first portion.

14. The method of claim 13, wherein the second counter is divided into a third portion and a fourth portion, wherein the third portion is a primary counter, and wherein the fourth portion is a secondary counter that is configured to mirror the third portion.

15. The method of claim 13 further comprising:
implementing an erase operation for both the first portion and the second portion in response to determining that the first counter should be erased.

16. A device comprising:
a non-volatile memory array comprising:
a first memory sector configured to implement a first counter, the first counter configured to store a first plurality of data values representing a plurality of count operations;
a second memory sector configured to implement a second counter, the second counter configured to store a second plurality of data values representing an initiation and a completion of each erase operation performed on the first counter such that at least two data values are stored in the second counter to identify a success or failure of each erase operation of the first counter based on their data values and further represent a partial count value; and
one or more processors configured to:
generate a count value based on a current counter value of the first counter, a current counter value of the second counter, and at least one physical parameter of the first counter.

17. The device of claim 16, wherein the at least one physical parameter comprises a size of a memory sector configured to implement the first memory sector.

18. The device of claim 16, wherein the one or more processors are further configured to:
store a first value when an erase operation of the first counter is initiated; and
store a second value when the erase operation is completed.

19. The device of claim 16, wherein the first memory sector is divided into a first portion and a second portion, wherein the first portion is a primary counter, wherein the second portion is a secondary counter that is configured to mirror the first portion, and wherein the one or more processors are further configured to:
implement an erase operation for both the first portion and the second portion in response to determining that the first memory sector should be erased.

20. The device of claim 19, wherein the second memory sector is divided into a third portion and a fourth portion, wherein the third portion is a primary counter, and wherein the fourth portion is a secondary counter that is configured to mirror the third portion.

* * * * *